March 24, 1931.      A. DURY      1,798,015
WINDSHIELD
Filed May 11, 1929
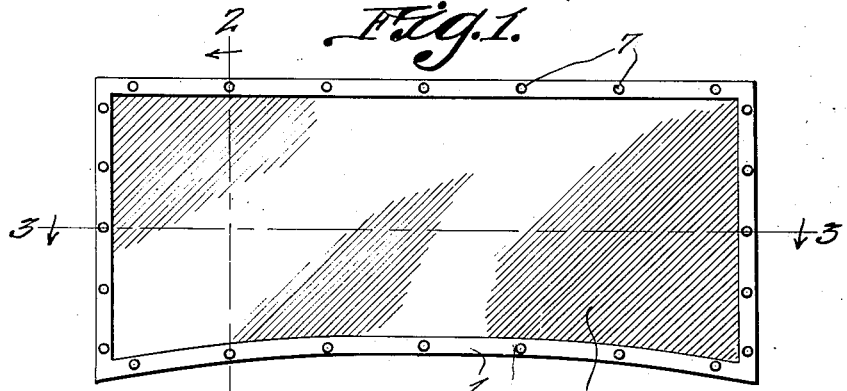
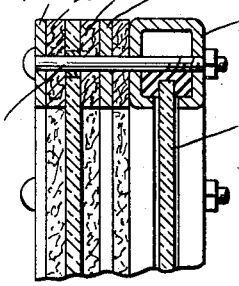
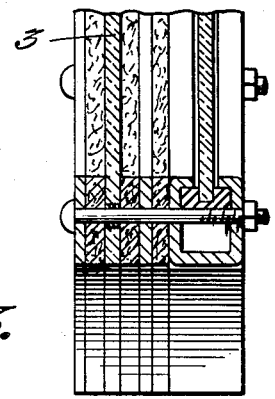
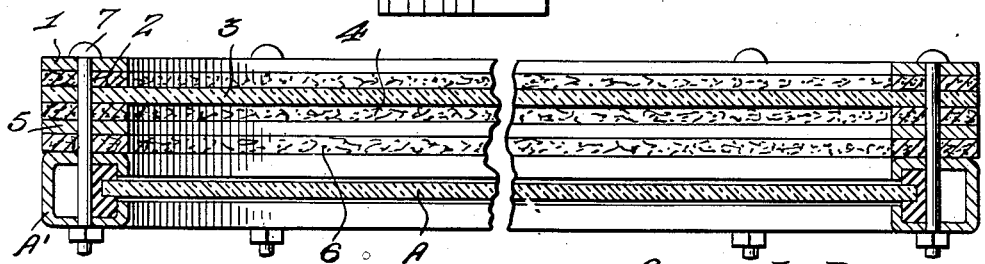
August Dury, INVENTOR
BY Victor J. Evans, ATTORNEY
WITNESS:

Patented Mar. 24, 1931

1,798,015

UNITED STATES PATENT OFFICE

AUGUST DURY, OF GREEN BAY, WISCONSIN

WINDSHIELD

Application filed May 11, 1929. Serial No. 362,332.

This invention relates to a windshield, the general object of the invention being to provide a frame carrying a transparent member and adapted to be fastened to the regular windshield so as to form an air space which prevents the accumulation of moisture and the like so that the driver has clear vision at all times.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a front view of the improved windshield.

Figure 2 is a section on line 2—2 of Figure 1.

Figure 3 is a section on line 3—3 of Figure 1.

In these views, A indicates the regular windshield of a vehicle and the numeral 1 indicates a frame. The numeral 2 indicates a strip of felt or the like placed on the inner face of the frame 1. A plate 3 of glass or the like has its edges engaging the strip 2 and a second strip 4 is placed on the outer edges of the other face of the transparent member 3. A second frame 5 is placed on the strip 4 and a strip 6 is placed on the other face of the frame 5. Bolts 7 pass through the two frames, the transparent member and the strips and these bolts also pass through the frame A' of the windshield. Thus the transparent member 3 forms an air space with the transparent member of the windshield A, and this space prevents the accumulation of moisture and the like on either one of the transparent members so that the driver has clear vision at all times.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A windshield comprising spaced outer and intermediate frames of substantially rectangular shape, adjustable fastening bolts extending through the frames, a transparent panel carried by one of the outer frames, a second transparent panel having the bolts extending therethrough and located between one of the outer frames and the intermediate frame and spaced therefrom, substantially rectangular shaped packing frames positioned between the frames and second mentioned panel and having the bolts extending therethrough, said bolts adapted to be adjusted to tightly clamp the frames and the second panel together to provide a dead air space between the panels.

In testimony whereof I affix my signature.

AUGUST DURY.